J. & E. APPLEBY.
THREAD GUIDE FOR COTTON SPINNING AND LIKE MACHINERY.
APPLICATION FILED FEB. 9, 1909.
942,362.
Patented Dec. 7, 1909.
2 SHEETS—SHEET 1.
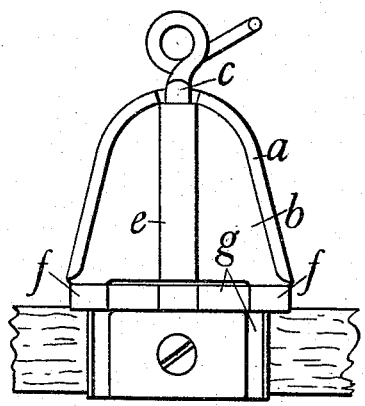
Fig. 1
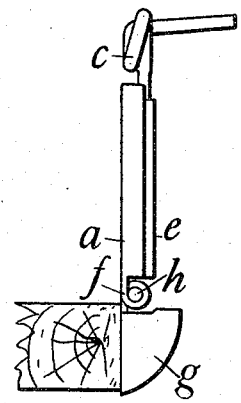
Fig. 2
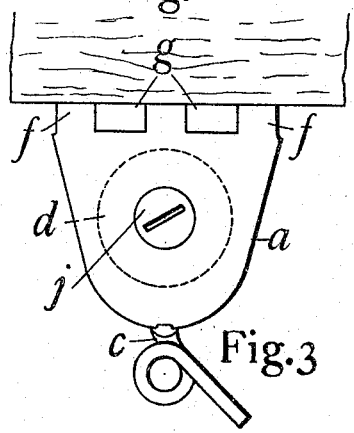
Fig. 3
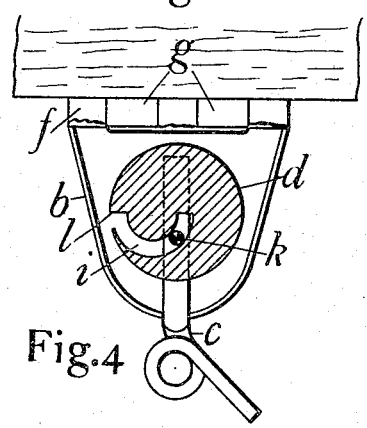
Fig. 4
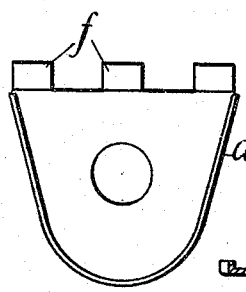
Fig. 5
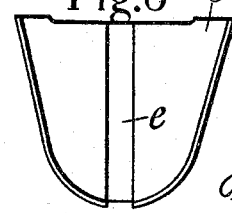
Fig. 7
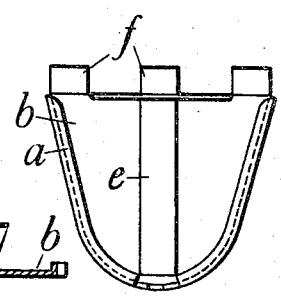
Fig. 8
Fig. 6
WITNESSES
W. P. Burke
Crew. G. Smith
INVENTORS
Joseph Appleby
Edwin Appleby
BY
J. M. Milan White
ATTY.

UNITED STATES PATENT OFFICE.

JOSEPH APPLEBY AND EDWIN APPLEBY, OF ASTON, NEAR BIRMINGHAM, ENGLAND.

THREAD-GUIDE FOR COTTON-SPINNING AND LIKE MACHINERY.

942,362. Specification of Letters Patent. Patented Dec. 7, 1909.

Application filed February 9, 1909. Serial No. 476,879.

*To all whom it may concern:*

Be it known that we, JOSEPH APPLEBY and EDWIN APPLEBY, subjects of Great Britain, residing at Tower Road, Aston, near Birmingham, England, have invented new and useful Improvements in Thread-Guides for Cotton-Spinning and Like Machinery, of which the following is a specification.

This invention relates to thread guides and similar fittings for cotton spinning and like machinery, and has for its object to provide for the more expeditious and convenient adjustment of the guide or the like than is afforded by the appliances now in use.

The invention comprises the employment in conjunction with a suitable flap or holder, of a cam like or equivalent adjustment and locking piece adapted to impart the required movements to the guide, and also to readily release the same when it is desired to completely withdraw the guide from the holder.

Figure 9:
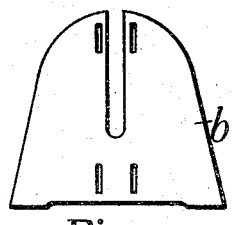
Figure 11:
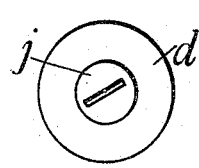
Figure 12:
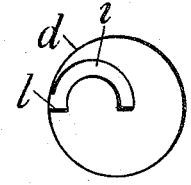
Figure 10:
Figure 13:
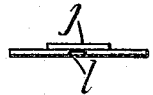
Figure 14:
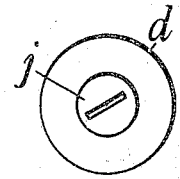
Figure 15:
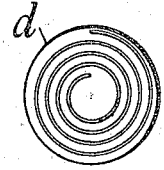
Figure 16:
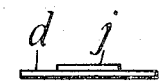
Figures 17, 18:
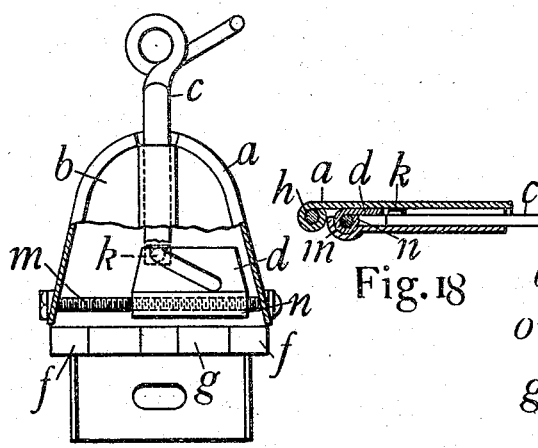
Figure 19:
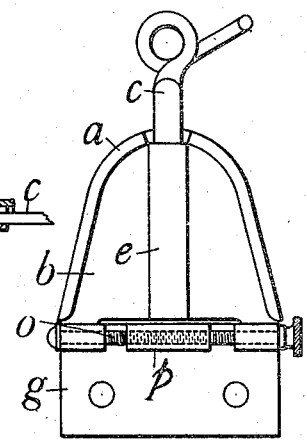

Referring to the two accompanying sheets of explanatory drawings:—Figure 1 is a front elevation and Fig. 2 a side elevation with the flap upturned, of a thread guide having this invention applied thereto. Fig. 3 is a plan with the flap in its normal position and Fig. 4 a sectional plan showing the guide actuating device. Fig. 5 is an inverted plan of one of the flap members and Figs. 6 and 7 are respectively plan and cross section of the companion member, while Fig. 8 is a plan of the members combined. Figs. 9 and 10 are plan and elevation of a modified form of lower member for the flap. Figs. 11, 12 and 13 illustrate by plan, inverted plan and elevation respectively one form of guide operating device, while Figs. 14, 15 and 16 are respectively similar views of a modified form of such device. Fig. 17 is an elevation with the flap upturned and Fig. 18 a longitudinal section of a flap having applied thereto a further modified form of guide operating device. Fig. 19 illustrates in elevation an upturned flap in which provision is made for lateral adjustment.

The same reference letters in the different views indicate the same or similar parts.

In carrying the invention into effect, we prefer to construct the flap or holder from a pair of plates $a$ $b$, suitably connected together to form a complete inclosure for the guide stem $c$ and the adjustment and locking piece $d$, and appropriately shaped to avoid objectionable angles or recesses liable to promote the lodgment of dust or "fly". The holder may be hinged as usual to a suitable bracket or rail. In the construction shown in the drawings each part $a$ $b$ is formed with a flange around the greater part of its edge, the flange on $a$ being deeper than that on $b$. The flange on the latter serves to keep the elements apart at the required distance while the flange on the former by being bent over the underside of the other (as shown at Fig. 8) serves to secure the two parts together. Fig. 5 shows the flange on $a$ prior to the bending over. The lower part $b$ may be formed with a channel $e$ to receive the stem $c$ of the guide as shown at Figs. 6, 7 and 8, or have attached thereto a separately produced channel as shown at Figs. 9 and 10. Portions $f$ of the hinge are formed on the part $a$ while the corresponding portions are provided on a bracket $g$ adapted for attachment to the usual rail or board. The flap is connected to the bracket by a hinge pin $h$.

Within the holder is mounted the rotatable adjustment and locking piece $d$ which in the form shown at Figs. 4, 11, 12 and 13 is formed with an open ended cam groove $i$ of curved configuration extending from or near the center to the periphery of the piece. Beneath the adjustment and locking piece lies the stem of the guide in the groove or channel in the lower plate of the holder, connection between the adjustment piece and guide stem being effected by a pin or projection $k$ which is formed as an integral part of such stem or is otherwise secured thereto. For the rotation of the adjustment and locking piece a boss $j$ from the latter projects through the upper plate of the holder, and a slot is provided in the boss to permit its rotation by a key or like instrument. On rotating the adjustment and locking piece a longitudinal movement is given to the guide and in consequence the latter can be very readily adjusted to the required position. When the pin on the guide stem is adjacent to the open end of the cam groove, the guide is free to be detached from the holder. By virtue of the shape of the cam groove the adjustment piece serves also to lock the guide as the latter is incapable of being moved except by the operation of the said piece. At or adjacent to the outer end of the cam groove a suitable shoulder or abutment $l$ or its equivalent may be formed or provided to limit the movement of the adjustment piece in one direction by the abutment of the said shoulder against the pin $k$ on the guide, or a stop on the holder itself. With such provision the movement of the adjustment piece is always arrested in the same position so that the guide can be immediately engaged with the adjustment piece on its reinsertion in the holder after withdrawal. The slot in the cam shown does not completely penetrate the member in which it is formed but is only sufficiently deep to afford an effective connection with the projection $k$ on the stem $c$. The upper surface of the cam is therefore plain. In the adjustment piece shown at Figs. 14, 15 and 16, the lower surface of the element $d$ is formed with a projecting spiral or cam like ridge or depression extending through several convolutions, such ridge or depression being engaged by the appropriately shaped end of the projection $k$ aforesaid. This form of adjustment piece affords a finer adjustment of the thread guide than the form shown at Figs. 4, 11, 12 and 13. Instead of providing a number of convolutions as shown, a single convolution may be employed, and a series of projections formed on the stem of the guide.

Instead of a rotatable adjustment and locking piece, a sliding piece $d$ (Figs. 17 and 18) may be adopted. The said piece is then arranged to move transversely to the guide stem and to actuate the latter by a suitably inclined or otherwise shaped slot or groove $i$ engaging with the guide stem as aforesaid. The adjustment of the part $d$ is effected by a screw $m$ passing through an internally screwed tubular part $n$ formed with the said part $d$.

Sometimes it is advantageous to provide for the lateral adjustment of thread guides. This may be effected by the use (as in hinges heretofore known for other purposes) of a screwed hinge pin $o$ (Fig. 19) arranged by its operation with a nut or internally screwed hinge portion $p$ of the flap to move the latter with respect to the supporting bracket. In this case a suitable space is provided as shown between the part $p$ and the hinge portions of the bracket $g$ to permit the required movement.

In the application of our invention we do not limit ourselves to any particular construction or disposition of our cam like or equivalent adjustment and locking piece nor to the manner of operating the same. When a key is undesirable, the rotatable piece may be made of sufficiently large diameter to project slightly through apertures in the sides of the holder. It may be then actuated directly by the fingers of the attendant.

Having thus described our invention what we claim as new and desire to secure by Letters Patent is:—

1. In thread guides and similar fittings for textile machinery, the combination with a holder, and a guide movable longitudinally with respect to the holder, of a movable cam like adjustment and locking piece adapted to impart the longitudinal movements to the guide and retain the same in position, substantially as described.

2. In thread guides and similar fittings for textile machinery, the combination with a holder, and a guide movable longitudinally with respect to the holder, of a rotatable cam like adjustment and locking piece adapted to impart the longitudinal movements to the guide and retain the same in position, substantially as described.

3. In thread guides and similar fittings for textile machinery, the combination with a holder and a guide movable with respect to the holder, of a rotatable adjustment piece, having a slot therein, and a projection from the guide engaging the slot, substantially as described.

4. In thread guides and similar fittings for textile machinery, the combination with a holder, and a guide movable with respect to the holder, of a rotatable adjustment piece, having a curved slot formed from the center to the periphery of the said piece, and a projection from the guide engaging the slot, substantially as described.

5. In thread guides and similar fittings for textile machinery, the combination with a holder, and a guide movable with respect to the holder, of a rotatable adjustment and locking piece, having a slot therein, a projection on the guide engaging the slot, and an abutment on the adjustment and locking piece adapted to limit the rotation of the said piece, substantially as described.

6. In thread guides and similar fittings for textile machinery, the combination comprising a pair of upper and lower plates forming a holder, said upper plate having an aperture therein and the lower plate having a channel therein, a guide movable in the channel, a rotatable adjustment and locking piece mounted between the plates, a boss on the said piece entering the aperture in the top plate, said piece having a slot therein, and a projection from the guide engaging the slot, substantially as described.

7. In thread guides and similar fittings for textile machinery, the combination comprising a pair of top and bottom plates forming a holder, said top plate having an aperture therein and the lower plate having a channel therein, a guide movable in the channel, a rotatable adjustment and locking piece mounted between the plates, a boss on the said piece entering the aperture in the holder top plate, said piece having a curved slot therein, a projection from the guide engaging the slot, an abutment at the end of the slot adapted to limit the rotation of the adjustment and locking piece, and a bracket to which the holder is hingedly connected, substantially as described.

In testimony whereof we have signed our names to this specification in the presence of two subscribing witnesses.

JOSEPH APPLEBY.
EDWIN APPLEBY.

Witnesses:
  JOHN MORGAN,
  HARRY DAVIS.